US012116500B2

(12) United States Patent
Andrie et al.

(10) Patent No.: US 12,116,500 B2
(45) Date of Patent: Oct. 15, 2024

(54) THERMAL BARRIER COATINGS CONTAINING ALUMINOSILICATE PARTICLES

(71) Applicants: Wisconsin Alumni Research Foundation, Madison, WI (US); Adiabatics, Inc., Columbus, IN (US)

(72) Inventors: Michael John Andrie, McFarland, WI (US); Lloyd Kamo, Columbus, IN (US); Alexander Kamo, Indianapolis, IN (US)

(73) Assignees: Wisconsin Alumni Research Foundation, Madison, WI (US); Adiabatics, Inc., Columbus, IN (US)

( * ) Notice: Subject to any disclaimer, the term of this patent is extended or adjusted under 35 U.S.C. 154(b) by 1825 days.

(21) Appl. No.: 16/036,364

(22) Filed: Jul. 16, 2018

(65) Prior Publication Data

US 2020/0017714 A1    Jan. 16, 2020

(51) Int. Cl.
*C09D 183/14*    (2006.01)
*C09D 1/00*    (2006.01)

(52) U.S. Cl.
CPC ............. *C09D 183/14* (2013.01); *C09D 1/00* (2013.01)

(58) Field of Classification Search
CPC .......... C09D 7/61; C09D 183/14; C09D 1/00; C09D 7/69; C09D 183/16; C09D 5/00; C08G 77/62; C08K 7/26; C08K 3/34

See application file for complete search history.

(56) References Cited

U.S. PATENT DOCUMENTS

| | | | | |
|---|---|---|---|---|
| 4,931,241 A | * | 6/1990 | Freitag | B28B 3/003 |
| | | | | 264/313 |
| 5,820,976 A | | 10/1998 | Kamo | |
| 7,381,261 B1 | * | 6/2008 | Nelson | C04B 28/14 |
| | | | | 106/675 |
| 8,286,596 B2 | | 10/2012 | Lemke et al. | |
| 8,522,829 B2 | | 9/2013 | D'Souza et al. | |
| 9,719,176 B2 | | 8/2017 | Schaedler et al. | |
| 2001/0043996 A1 | * | 11/2001 | Yamada | C03C 11/002 |
| | | | | 428/34.4 |
| 2006/0266264 A1 | * | 11/2006 | Howe | C04B 28/342 |
| | | | | 106/690 |
| 2013/0295372 A1 | | 11/2013 | Liu et al. | |
| 2015/0099078 A1 | * | 4/2015 | Fish | C09D 183/04 |
| | | | | 428/36.4 |

FOREIGN PATENT DOCUMENTS

WO    WO 2018/005416    1/2018

OTHER PUBLICATIONS

Sil-Cell, Sil-Cell Cellular Microsphere Filler, SILBRICO Corporation, Hodgkins, IL, 2011, pp. 1-2.
(Continued)

*Primary Examiner* — Samir Shah
(74) *Attorney, Agent, or Firm* — Bell & Manning, LLC

(57) ABSTRACT

Thermal barrier coatings and substrates, including engine components, coated with the thermal barrier coatings are provided. Also provided are methods for making and applying the thermal barrier coatings. The coatings include aluminosilicate particles dispersed in an organic polysilazane or metal phosphate binder.

6 Claims, 6 Drawing Sheets

(56) References Cited

OTHER PUBLICATIONS

Sil-Cell, SILBRICO Corporation Safety Data Sheet, Sil-Cell—All Grades , Sep. 29, 2014, pp. 1-4.
Perlite Institute, Inc., Applications of Perlite the Versatile Mineral, Perlite Institute, Inc., 2009, pp. 1.
Merck, Technical Data Sheet, Merck, Durazane 1500 rapid cure, Nov. 17, 2015, pp. 1-3.
Merck, Safety Data Sheet Durazane 1500 rapid Cure, Merck, Nov. 17, 2015, pp. 1-12.
Zirox CS Series Stabilized Zirconium Oxides, TAM Ceramics LLC, 1 page, 2010.
Material Safety Data Sheet—Sodium Potassium Aluminum Silicate, SIG Manufacturing Company, Jan. 1, 2010.

* cited by examiner

THERMAL BARRIER COATINGS CONTAINING ALUMINOSILICATE PARTICLES

REFERENCE TO GOVERNMENT RIGHTS

This invention was made with government support under DE-AR0000600 awarded by the DOE/ARPA-e. The government has certain rights in the invention.

BACKGROUND

It is often necessary to provide a ceramic coating with high thermal barrier (insulative) properties. This is traditionally done by using an insulative refractory oxide, such as zirconium oxide, in the coating. However, even when such a material is employed, a relatively thick coating is generally necessary to provide adequate insulative properties (e.g., thermal conductivity less than or equal to 1.5 W/m° K). In addition, the thermal expansion and contraction of zirconium oxide particles in the coating may lead to coating failure.

Air, having high thermal insulative properties, is a good insulator. Several methods have been employed to include air in a ceramic coating. For example, air may be included by adding burn-out materials, such as hollow glass beads or polystyrene particles, to the coating before densification. Densification temperatures melt or sublime the burn-out materials, leaving pockets of air trapped in the coating. Unfortunately, this procedure can result in some channeling of air pockets, creating weak spots within the ceramic coating. Many of these coatings are unable to withstand the intense heat (1,500° F. or higher) of practical applications, as in internal combustion engines, because heat causes the air to expand relative to the base material and crack the coating.

SUMMARY

Thermal barrier coatings and substrates, including engine components, coated with the thermal barrier coatings are provided.

One embodiment of a thermal barrier coating includes aluminosilicate particles dispersed in an organic polysilazane binder or a metal phosphate binder. The aluminosilicate particles may contain 5 percent or more, based on weight, of aluminum oxide.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
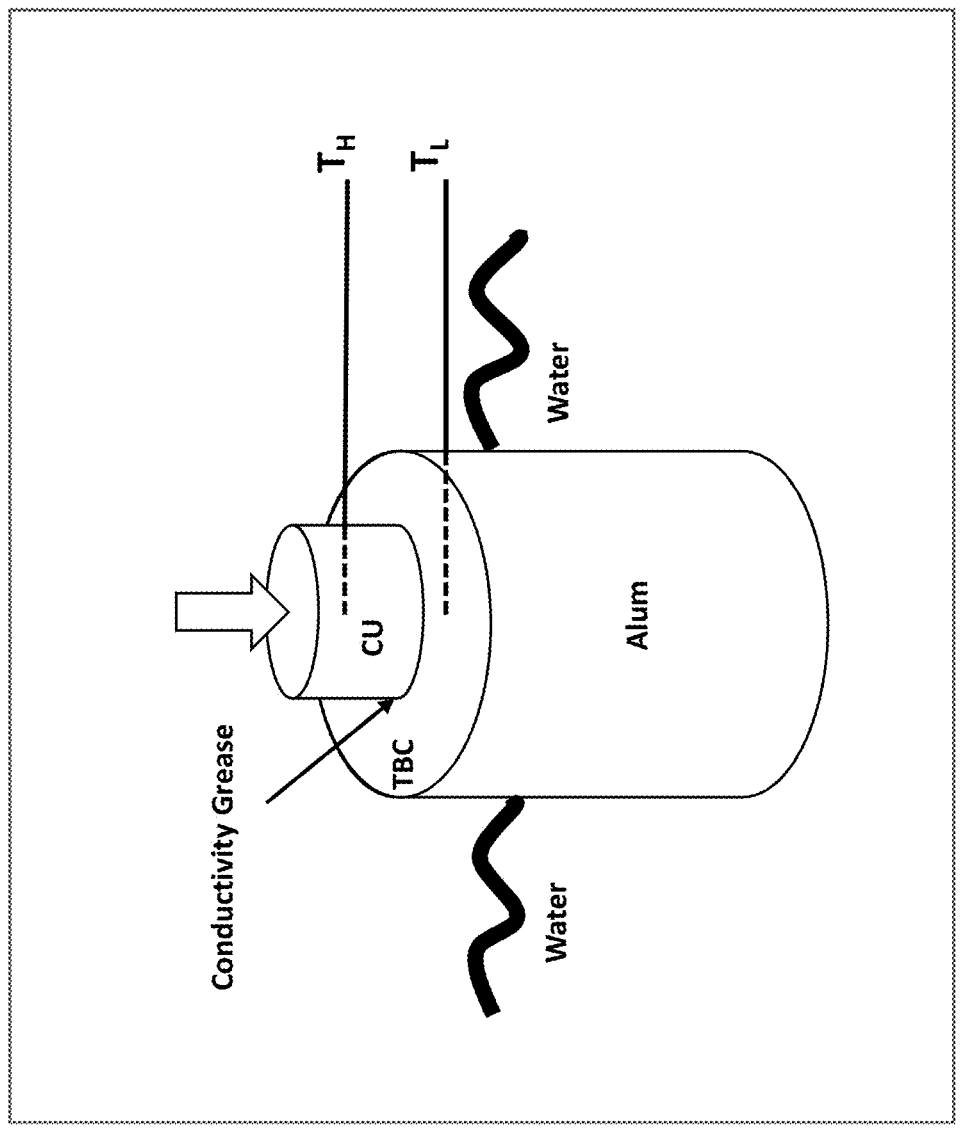
FIG. 1 is a schematic diagram of an apparatus for measuring the thermal conductivity of a thermal barrier coating.

Thermal barrier coatings and substrates, including engine components, coated with the thermal barrier coatings are provided. Also provided are methods for making and applying the thermal barrier coatings. The coatings include aluminosilicate particles dispersed in a binder. The aluminosilicate particles are characterized in that they have a high aluminum oxide content, relative to other silica-based particles, such as sodium borosilicate glasses. In some embodiments of the coatings, the binder is a polysilazane binder, while in other embodiments of the coatings the binder is a metal phosphate binder.

The coatings have very low densities and thermal heat capacitance and provide good thermally insulating properties, even at low coating thicknesses. In particular, embodiments of the coatings have thermal conductivities of less than 0.5 W/m-K, which is a common target for thermal barrier coatings. In addition, the coatings are slightly flexible and durable while being able to withstand many thermal cycles at extremely high temperatures without chipping or cracking due to thermal cycling or loss of insulating performance. Thus, the coatings are well suited for use as thermal barriers in the high-temperature environments of internal combustion engines.

By way of illustration, the coatings can be applied to the cylinder head, pistons, valves, exhaust port, exhaust manifold, turbine blades, and/or housing of an internal combustion engine. However, the coatings can also be applied to other substrates for which thermal insulation is beneficial. These include, but are not limited to: combustion chamber surfaces; building substrates, including ducts, fireboxes, and/or roofing; and appliance components, including electrical components, refrigerator components, and components in heating and air conditioning systems. The materials from which the substrates can be composed include metals, including metal alloys (e.g., aluminum alloys and steel, including high nickel stainless steel), metal oxides, ceramics, and plastics.

The aluminosilicate particles have an aluminum oxide content of at least 5 wt. %. This includes embodiments of the aluminosilicate particles having an aluminum oxide content of at least 10 wt. %. By way of illustration, the aluminosilicate particles may have an aluminum oxide content in the range from 5 wt. % to 40 wt. %; from 10 wt. % to 40 wt. %; or from 10 wt. % to 25 wt. %. Without intending to be bound to any particular theory of the inventions described herein, the inventors believe that the use of aluminosilicate particles with relatively high aluminum oxide contents is advantageous because they have higher transformation temperatures and softening points, as compared to other glasses, such as sodium glass or sodium borosilicate glasses, and improved surface compressive strength and binder bonding properties. As a result of these features, aluminosilicates described herein are especially suitable for the use in thermal barrier coatings for internal combustion engines.

The aluminosilicate particles may be alkali aluminosilicate particles, including sodium aluminosilicate particles and sodium, potassium, aluminosilicate particles. The aluminosilicate particles can take on a variety of forms. For example, in some embodiments of the coatings, the aluminosilicate particles are expanded perlite microparticles having multichambered internal porosities; in other embodiments of the coatings, the aluminosilicate particles are hollow aluminosilicate spheres, which are also referred to as micro-balloons; and in other embodiments of the coatings, the aluminosilicate particles comprise fly ash particles.

The expanded perlite microparticles are composed of perlite, a natural volcanic glass mineral, that is expanded and made porous by heating. Perlite is an aluminosilicate composed predominantly of silicon dioxides with substantial amounts of aluminum oxide and typically small quantities of other oxides, such as sodium oxide, potassium oxide, and calcium oxide. The silicon oxides and aluminum oxides together may account for about 85 wt. % to 95 wt. % (e.g., about 90 wt. %) or greater of the perlite.

In the thermal barrier coatings described herein, the expanded perlite microparticles may be "low-fired" particles. Typically, ceramic particles are fired or sintered to a complete or near molten state. This can be done under pressure and is generally referred to as high firing, usually at temperatures exceeding >2200° F. (1200° C.). High firing leaves a ceramic that is extremely strong, but non-porous. In the case of low firing, there are no specific additives or binders used and the curing occurs at a lower temperature (i.e. <1900° F. (1035° C.)). The resulting "low fired" ceramic body is typically weaker than a high-fired ceramic, but also porous. In the present thermal barrier coatings, the high levels of porosity allow for binders and resins to penetrate into the ceramic and bond with the ceramic's elements, thereby strengthening the final coating and mitigating any drawbacks due to the weaker nature of the low-fired particles.

The expanded perlite microparticles are thermally stable, low density particles with open porous surfaces and multichambered (i.e., multipored) internal porosities. As a result, the coating binder, which may be applied as a liquid resin, material can be considered thermally stable at a given temperature if it does not undergo significant melting or sublimation at that temperature.

The expanded perlite microparticles have low densities, typically having effective specific gravities (E.S.G.) lower than 0.45 g/cm$^3$. For example, the expanded perlite microparticles may have densities in the range from 0.15 g/cm$^3$ to 0.4 g/cm$^3$. This includes embodiments of the expanded perlite microparticles having densities in the range from 0.17 g/cm$^3$ to 0.35 g/cm$^3$, and further includes embodiments of the expanded perlite microparticles having densities in the range from 0.2 g/cm$^3$ to 0.3 g/cm$^3$ (E.S.G.).

The expanded perlite particles may have diameters of less than 1000 μm. For example, the expanded perlite microparticles may have particles sizes in the range from 1 μm to 300 μm, including the range from 1 μm to 150 μm, and average particles sizes in the range from 30 μm to 80 μm, including in the range from 32 μm to 75 μm. The particle sizes of the microparticles can be selected to provide a thermal barrier coating with a desired thickness; smaller particles and lower particle concentrations will generally produce a thinner coating. Thus, by using small perlite microparticles, coatings having thicknesses of 0.25 mm (250 μm) or lower can be formed without sacrificing durability (e.g., flexibility) and insulating performance. Some embodiments of the coatings have a thickness of less than 500 μm. This includes coatings having a thickness in the range from 20 μm to 400 μm. This is advantageous for applications, such as engine coatings, because thicker coatings may retain a significant level of heat, adversely affecting incoming air and fuel charge. However, thicker coatings, including coatings having a thickness of up to 1 mm, 2 mm, or even higher, can be formed where a higher coating thickness is desirable.

Expanded perlite microparticles that can be used in the thermal barrier coatings include those having the properties shown in the table below.

|  | Powder 1 | Powder 2 | Powder 3 | Powder 4 | Powder 5 |
|---|---|---|---|---|---|
| Effective Particle Density Range (g/cm$^3$) | 0.160-0.184 | 0.197-0.231 | 0.228-0.250 | 0.244-0.277 | 0.310-0.345 |
| Dry Bulk Density Range (g/cm$^3$) | 0.104-0.120 | 0.128-14.4 | 0.136-0.152 | 0.160-0.176 | 0.200-0.216 |
| Average Particle Size (μm) | ~75 | ~45 | ~40 | ~37 | ~32 |
| Particle Size Range (μm) | 1-300 | 1-220 | 1-150 | 1-150 | 1-110 |
| Thermal Conductivity | 0.36 | 0.40 | 0.41 | 0.43 | 0.45 | can infiltrate into the surface pores. In addition, the binder can react with the SiO$_2$ at the surface of the of the particles to generate strong oxide bonds. Thus, the low-fired expanded perlite particles are able to form both mechanical and chemical bonds with the binders, resulting in high coating integrity. Moreover, the high internal porosity provides trapped air for good thermally insulating properties and the use of these discrete porous microparticles prevents channeling of air pockets.

The expanded perlite microparticles are stable at temperatures ranging from typical curing temperatures for the liquid binders up to very high temperatures, such as typical combustion temperatures of up to at least 1300° C. and even up to at least 1760° C. For the purposes of this disclosure, a The aluminosilicate micro-balloons are so-called because they are hollow, generally spherically-shaped aluminosilicate particles. The micro-balloons also may be microparticles; that is, they may have particle diameters of 1000 μm or less, typically, 500 μm or less.

The binders used in the coatings are characterized by low thermal capacitance, typically no greater than 800 kJ/cm$^3$-K and desirably no greater than 300 kJ/cm$^3$-K. In some embodiments of the thermal barrier coatings, the binder comprises an organic polysilazane and in some embodiments organic polysilazanes are the only binders present in the coatings. The organic polysilazanes are polymers with silicon and nitrogen in their backbones and that also include and carbon. Suitable organic polysilazanes include methyl-substituted organopolysilazanes. The organic polysilazanes may be combined with inorganic polysilazanes. However, any inorganic polysilazanes will generally be present at low concentrations, typically making up no greater than about 6 wt. % of the binder. For example, a methyl-substituted organic polysilazane can be mixed with a small quantity (e.g., ≤5 wt. %) of a 3-aminopropyltriethoxysilane (≤5%).

In other embodiments of the thermal barrier coatings, the binder comprises a metal phosphate comprising a phosphoric acid and a metal compound, such as a chrome oxide.

Optionally, additional particulate additives can be included in the coatings in order to improve and/or tailor their properties. For example, particles of other refractory materials, such as ceramics, can be included in the slurries and incorporated into the coatings. These particles are heat resistant and have low thermal conductivities and, desirably, also low densities. The refractory particles may be oxides, carbides (e.g., boron carbide), nitrides, silicides, borides, intermetallics, zirconates, titanates, borocarbides, ferrites, metals, metal alloys, oxides, complex oxides and mixtures thereof. Specific refractory oxides that may be used are oxides of aluminum, barium, beryllium, calcium, chromium, cobalt, copper, gallium, hafnium, iron, lanthanum, magnesium, manganese, molybdenum, nickel, niobium, tantalum, thorium, tin, titanium, tungsten, uranium, vanadium, yttrium, zinc, zirconium, and mixtures thereof, and cadmium, lithium, and strontium. Refractory metal particles include particles of stainless steel, molybdenum, titanium, aluminum, iron, nickel, chromium, tungsten, and copper. The refractory particles can be dispersed in the binder along with the alumnosilicate microparticles in order strengthen the final coating. When present, these additive particles will generally be present at a low concentration in the coatings. The additive particles will typically make up less than 15 weight percent (wt. %) of the particle content (i.e., less than 15 wt. % of the total of the silica particles+additional particle additive) in the coatings, with the silica particles making up the balance. More typically, the additional particulate additives will make up less than 10 wt. % of the coatings. By way of illustration, in some embodiments of the coatings, additive refractory particles make up between 1 wt. % to 9 wt. % of the inorganic particle content of the coatings. The additional refractory particles may be microparticles, having diameters of less than 1000 μm, including less than 100 μm, and further including less than 10 μm.

The concentration of aluminosilicate particles in the coatings can vary over a wide range. For example, the aluminosilicate particle concentration in the coatings can be in the range from 5 wt. % to 60 wt. %. However, in some embodiments the aluminosilicate particles are the predominant component in the coatings, making up at least 50 wt. % of the final coating. This includes coatings having an aluminosilicate particle content of at least 20 wt. %. By way of illustration, some embodiments of the coatings have an aluminosilicate particle content in the range from 30 wt. % to 50 wt. %, with the balance being composed of binder and, if present, other additive particles.

The coatings can be made by forming a slurry of aluminosilicate particles, a binder, and, optionally, any additional refractory particles, and applying the slurry to a substrate to be coated. The binder can be dissolved in an organic solvent or a mixture of organic solvents to form the slurry. The solvent or solvents should be selected such that the binder is substantially soluble therein and the aluminosilicate particles are substantially dispersible therein. For example, to form a slurry of expanded perlite microparticles and a polysilazane resin, iso paraffinic naptha, parachlorobenzo-trifluoride, tertiary butyl acetate, or a mixture of two or more thereof can be used. However, other solvents, such as chloro-trifluoro ethane, butanol, and/or butadiene can be used. The slurries can be applied to the surface of a substrate using a variety of coating techniques, including spraying, brushing, dipping, casting, and spin-coating. Suitable spraying techniques include electrospraying.

After the slurry is applied, the binder in the slurry is cured at an elevated temperature to burn off the volatile solvents and form a coating of the aluminosilicate particles in a binder matrix. During the cure, a polysilazane binder forms oxygen bonds with the aluminosilicate particles and may also form chemical bonds to any additional refractory particles that are present. Curing typically can be carried out at temperatures in the range from 200° C. to 425° C. However, temperatures outside of this range can also be used. Because the slurry is absorbed into the porosity of porous particles, such as expanded perlite microparticles, when such particles are used in the coatings, upon the curing of the liquid binder, the highly porous microparticles are strengthened to provide a coating with a high compressive strength, even if the perlite microparticles initially have a low compressive strength.

The coatings are characterized by very low densities, heat capacities, and thermal conductivities and high strengths. By way of illustration, some embodiments of the coatings have densities of less than 1.2 $g/cm^3$. This includes embodiments of the coatings having densities of less than 0.7 $g/cm^3$ and further includes embodiments of the coatings having densities of less than 0.5 $g/cm^3$. For example, some embodiments of the coatings have densities in the range from 0.1 to 0.7 $g/cm^3$ or from 0.2 to 0.7 $g/cm^3$.

Some embodiments of the coatings have heat capacities of less than 1400 $kJ/m^3$-K at 300° C. This includes embodiments of the coatings having heat capacities of less than 700 $kJ/m^3$-K at 300° C. and further includes embodiments of the coatings having heat capacities of less than 500 $kJ/m^3$-K at 300° C. For example, some embodiments of the coatings have heat capacities in the range from 400 $kJ/m^3$-K at 300° C. to 650 $kJ/m^3$-K at 300° C. Some embodiments of the coatings have thermal conductivities of less than 0.5 W/m-K. This includes embodiments of the coatings having thermal conductivities of less than 0.4 W/m-K and further includes embodiments of the coatings having thermal conductivities of less than 0.3 W/m-K. For example, some embodiments of the coatings have thermal conductivities in the range from 0.25 W/m-K to 0.35 W/m-K.

In addition, the coatings can have very high bonding strengths to a variety of commercially relevant substrates, including stainless steel (e.g., high nickel stainless steel). For example, embodiments of the coatings can be bonded to aluminum alloy substrates with a minimum bonding strength of at least 20 MPa.

For the purposes of this disclosure, densities, thermal conductivities, and bonding strengths can be measured according to the procedures described in the Example below.

EXAMPLE

This example illustrates the formation and use of thermal barrier coatings comprising expanded perlite microparticles or hollow sodium potassium aluminosilicate particles in an organic methyl-substituted polysilazane binder or a metal phosphate binder. The coatings further include refractory particles (boron carbide ($B_4C$; 8 μm average particles size); and/or calcium oxide-stabilized zirconium oxide particles (Zirox CS-325 mesh; TAM Ceramics LLC))). For the purposes of this example, the organic polysilazane-based coating is referred to as the "RC" coating and the metal phosphate-based coating that included expanded perlite microparticles is referred to as the "PC" coating.

The expanded perlite microparticles comprised about 73 wt. % silicon dioxide and 17 wt. % aluminum oxide. They had an effective particle density of about 0.22 g/cm$^3$, a dry bulk density of about 0.14 g/cm$^3$, and an average particle size of about 45 µm.

Coating Preparation

Organic Polysilazane-Based Coatings.

The organic polysilazane-based coatings were deposited as a slurry using a solution comprising the polysilazane in tertiary butyl acetate. The acetate is a reactive component that allowed the coating to bond at a temperature of 350° F. (~180° C.). It burned out above 750° F. (~399° C.), leaving the polysilazane component to generate internal oxide bonds to the silicate particles (i.e., expanded perlite or hollow sodium potassium alumino silicate). The B$_4$C was added when temperature exceeded 2400° F. (~1315° C.), a temperature that is commonly reached in high output engines. The remaining polysilazane reacted with the B$_4$C to generate a silicon nitride/carbide matrix within the SiO$_2$ structure of the silicate particles.

Slurries were created by first mixing the refractory oxide particles with the perlite particles or the hollow sodium potassium alumino silicate particles with the boron carbide particles and combining the particle mixtures with the polysilazane solutions. The resulting slurries contained approximately. 13 wt. % organic polysilazane, 65 wt. % butyl acetate, 20 wt. % aluminisilicate particles, and 2 wt. % refractory metal oxide particles.

Metal Phosphate-Based Coatings.

The metal phosphate-based coatings used an inorganic metal phosphate resin binder that was 40 wt. % chrome oxide and 60 wt. % phosphoric acid. It is an acid that can be diluted up to 3 parts water to 1 part binder. The dilution ratio used was dependent on the substrate reaction to the acid and type of substrate material (e.g. more corrosion resistant substrates require a lower pH binder).

To prepare a composition to be applied as a coating, the particle composition shown in Table 2 was mixed with the metal phosphate resin binder until a suitable spray viscosity was achieved. Typically, this was about 25 to 35 g binder to 100 g powder. The resulting coatings could be brushed, dipped or spray coated. They were then dried and baked at a cure temperature of 580° F.

TABLE 1

Powder Composition for Polysilazane-Based Coatings.

| Ingredient | Percentage (by wt.) | Approx. Particle Size |
|---|---|---|
| Boron Carbide | ~9 | 8 micron |
| Expanded Perlite or Hollow Sodium Potassium Alumino Silicate | ~91 | 1-220 µm |

TABLE 2

Powder Composition for Inorganic Metal Phosphate (PC)-Based Coatings.

| Ingredient | Percentage (by wt.) | Approx. Particle Size |
|---|---|---|
| Tam Ceramics CS-325 ZrO$_2$ | 1-15 | −325 mesh (avg. 20 µm) |
| Expanded Perlite | 85-99 | 1-220 µm |

The spraying methods used for the RC and the PC coatings used a commercial High Velocity Low Pressure (HVLP) spray gun by Binks and agitating mixer cup to hold the "slurry" coating and keep it mixed. The engine parts were cleaned to be free of oil and grit blasted with 60 grit media at 100 psi compressed air pressure. The surface finish of the engine part should have an approximate 15 to 20 micron A-A surface finish. The parts were sprayed using the HVLP sprayer and then air dried at 110° C. to remove most of the solvent or water. The coated parts were then heated to 304° C. and held for 1 hour.

The RC coating had an organic polysilazane content of about 37 wt. %, an expanded perlite particle content of about 57 wt. %, and a boron carbide content of about 6 wt. %.

The PC coating had a metal phosphate content of 74 wt. %, an expanded perlite particle content of 19 wt. %, and a zirconium dioxide content of 7 wt. %.

Comparison of Thermal Barrier Coatings

The thermal properties of the RC coating and the PC coating were studied. FIG. 1 is a schematic diagram of the test equipment used to measure the thermal conductivity of the coatings. The thermal barrier coatings were applied to the surface of an alum disc using the previously described spray coating technique and the alum disc was cooled by submersion in temperature-controlled water bath. An insulated copper cylinder that was heated by a insulated heater was then placed in contact with the thermal barrier coating with an intervening coating of conductivity grease. Temperature difference were then created across the thermal barrier coating. To determine temperature of the coating and the alum disc substrate, two thermocouples were used. One of the thermocouples was placed on the copper cylinder and the other was placed on the alum disc. The results of the thermal conductivity measurements are shown in Table 3.

Specific Heat ($C_p$) is measured directly using a standard Differentiating Scanning calorimeter (DSC) measurement procedure in which a heating rate difference was measured between a reference pan and a sample pan as temperature was ramped. The slope of the heat flow $\dot{Q}$ was used to calculate $C_p$ in J/gm-K. The sample and reference pans were tzero aluminum pans for TA instruments Q100 DSC. The ramp rate was 20° C./min with a sample size of 5-10 mg.

Figure 2:
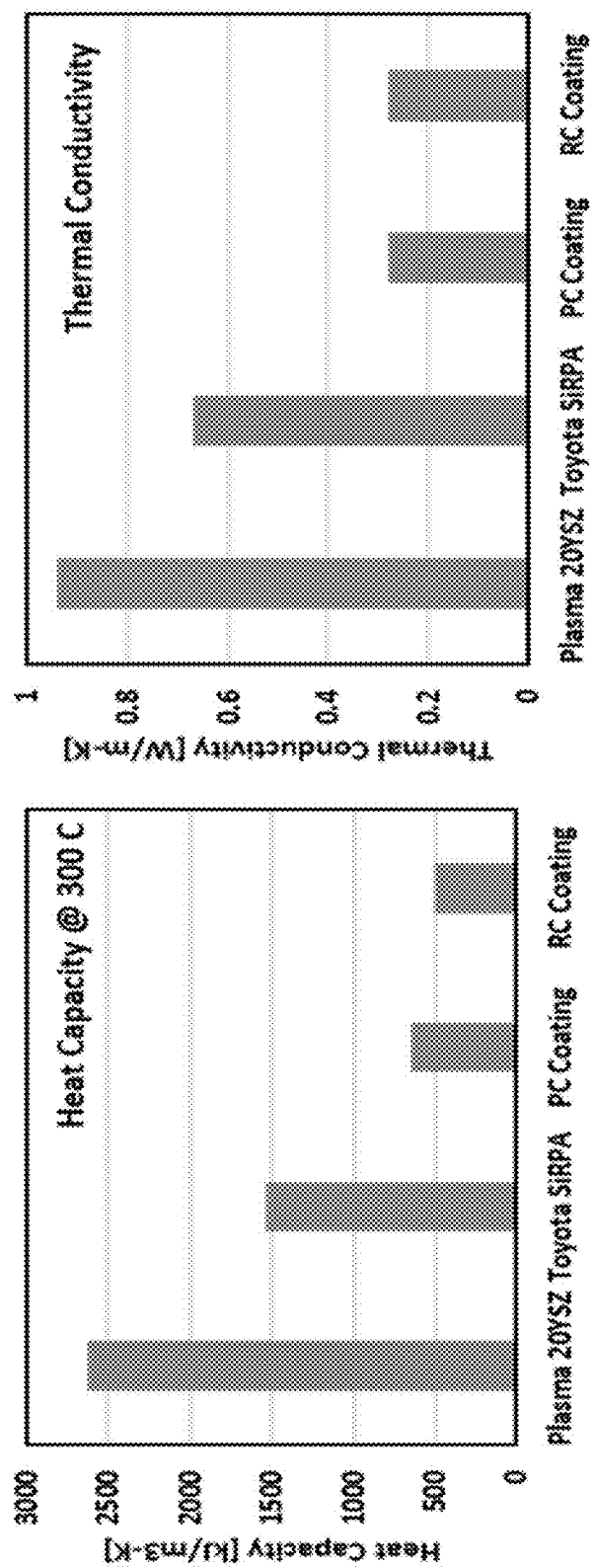
FIG. 2 shows the heat capacity and thermal conductivity for the PC and RC coatings compared to a Plasma 20YSZ coating and a Toyota SiRPA® coating.

FIG. 2 shows a comparison of the thermal conductivity and heat capacity of a plasma spray deposited 20YSZ (i.e., zirconia stabilized with 20 weight percent yttria), a metal based, silica-reinforced porous anodized aluminum coating from Toyota (Toyota SiRPA® coating), and the two coatings studied in this example (PC and RC). Both the PC and RC coatings had at least a 70% lower thermal conductivity and a 75% lower heat capacity than a Plasma 20YSZ. The RC coating provided the best overall performance due to its 23% lower heat capacity than the PC coating.

Bulk density (p) and porosity were measured directly by Adiabatics, Inc. using the method of Archimedes displacement for the thermal barrier coatings. The coating samples were measured on aluminum substrates taking into account the density of the aluminum disc. The results of the density measurements are shown in Table 2.

Porosity (Φ), was calculated using the equation:

$$\Phi = V_{Pores}/V_{bulk} = \Delta W_{w-d\ (wet-dry)}/\Delta W_{w-s\ (wet-submerged)}$$

here V is volume and W is weight. The measurements were usually done on an alum disc. Bond strength was measured in accordance with the ASTM 663 Epoxy Pull Test Procedure.

The PC and RC coatings were applied to the tops of the pistons at a target thickness of 0.1 mm. The RC coating was also applied to the head of the engine. A material properties comparison of the PC and RC coatings to the cast head and forged piston is shown in Table 3. Both coatings have significantly lower thermal conductivity and heat capacity than either of the aluminum alloys of the uncoated engine. As a result, the PC and RC coated piston engine configurations should exhibit lower heat loss, higher exhaust loss, and higher thermal efficiency.

TABLE 3

Comparison of engine material and coating properties

| Coating | Head 319-T5 Al | Piston 4032 Al | PC | RC |
|---|---|---|---|---|
| Thermal Conductivity [W/m-K] | 109 | 141 | 0.28 | 0.28 |
| Heat Capacity@ 300 C. [kJ/m$^3$-K] | 2687 | 2315 | 650 | 500 |
| Density [g/cm$^3$] | 2.79 | 2.68 | 0.60 | 0.45 |
| Nominal Coating Thickness [mm] | — | — | 0.081 | 0.091 |
| Bond Strength [MPa] | | | 15 | 14 |

Engine Coating Performance Testing

The data reported here compares the thermal efficiency and heat loss of operation for a coated piston and head in a spark ignited natural gas engine relative to operation without the coatings. The example also describes the effects of the coatings on the knock limit spark advance (KLSA) in the high compression ratio engine across methane numbers.

For this investigation a modified Honda PCX 125 cc engine was used. The relevant engine geometry parameters are listed in Table 3. The modification to the stock engine was the installation of custom domed pistons. In addition, the stock cooling pump was removed and an auxiliary PID controlled cooling system was implemented.

TABLE 3

Experimental engine specifications.

| Base Engine | Modified Honda PCX |
|---|---|
| Displacement [cc] | 125 |
| Bore × Stroke [mm] | 52.4 × 57.9 |
| Compression Ratio | 17.0:1 |
| Valvetrain | Overhead 2 Valve |
| Cooling | Liquid Cooled |

Operating Conditions

The application of the coatings to the engine parts led to the study of four systems: (1) uncoated engine, (2) PC coated piston, (3) RC coated piston, and (4) RC coated head and piston. For each experiment, the engine was operated at 1400 rev/min. with a methane number swept from 100 to 60 using an increasing propane fraction. The main engine operating conditions are shown in Table 4. At each methane number for each experiment, the spark timing was swept to find the maximum brake torque (MBT) timing and knock limited spark advance (KLSA) timing.

TABLE 4

Engine operating conditions

| Engine Speed [rev/min] | 1400 |
|---|---|
| Equivalence Ratio [—] | 1 |
| Fuel Methane Number [—] | 60-100 |
| EGR Rate [%] | 0% |
| Intake Pressure [bar] | 1 |

TABLE 4-continued

Engine operating conditions

| Coolant Temperature [C.] | 100 |
|---|---|
| Oil Temperature [C.] | 70 |

Knock Quantification

To find the KLSA timing, criteria were set to define knock. Using the engine geometry, the acoustic modes of the cylinder were found based on the methods in Draper et al. to set up the limits of a second order band pass filter. (See, e.g., C. S. Draper, "Pressure Waves Accompanying Detonation in the Internal Combustion Engine," *J. Aeronaut. Sci.*, vol. 5, no. 6, pp. 219-226, 1938.) The recorded cylinder pressure of 500 cycles at each spark timing were filtered and examined. Based on experimental observation, a threshold value of 20 kPa was set as the limit to quantify a cycle as having knock. If more than 25% of the 500 cycles exceeded the threshold value, the spark timing was considered to be knocking.

Results

MBT Timing

Figure 3:
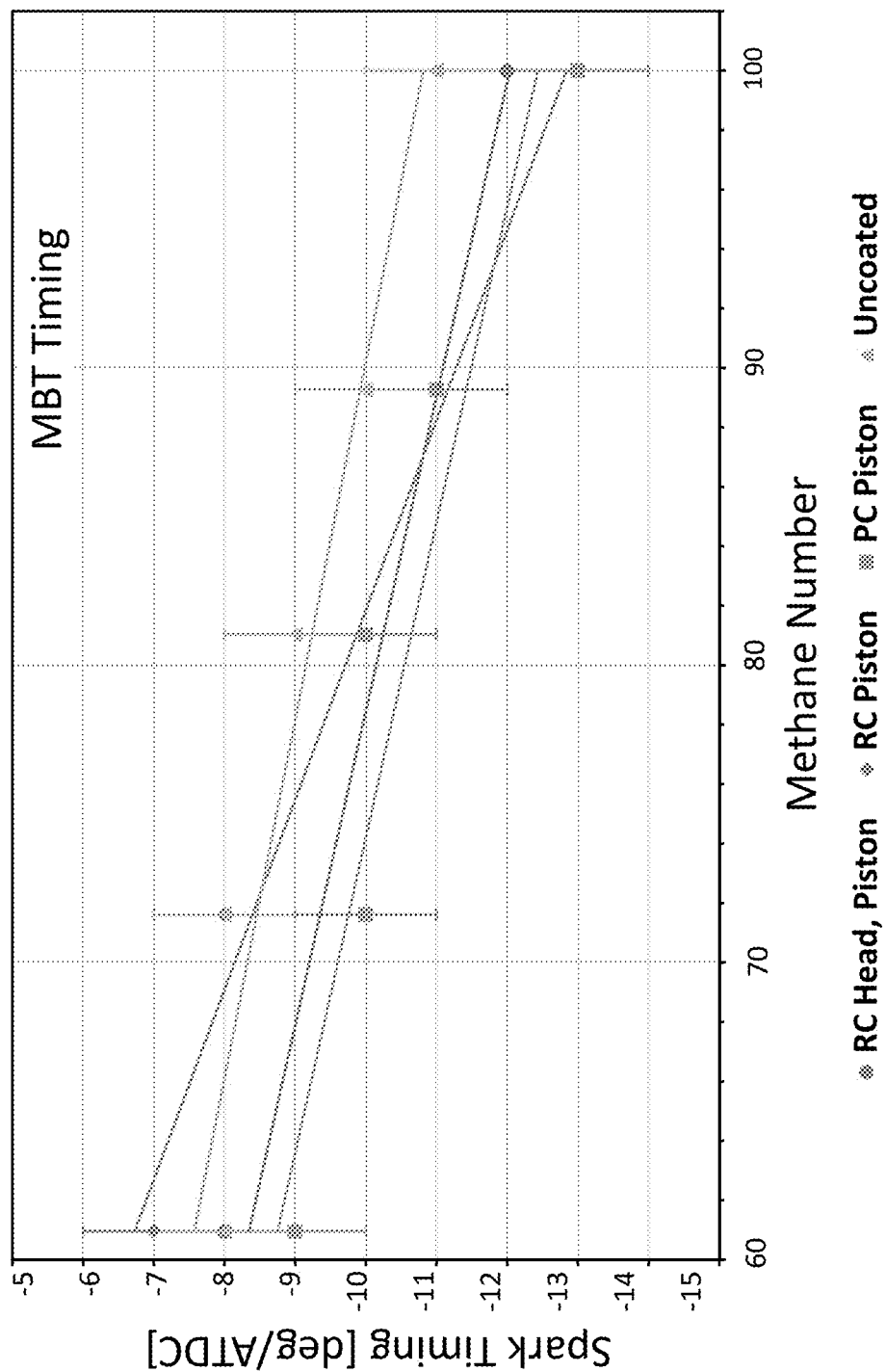
FIG. 3 depicts the MBT spark timing versus the methane number for each coating in the Example.

At each methane number for each coating configuration, the spark timing was swept to find the maximum brake torque (MBT) timing shown in FIG. 3. As the methane number decreased, the MBT timing moved toward the top dead center, due to the decreasing combustion duration, which corresponds with the decreasing methane number. There was no discernable trend in the change of MBT timing between the coated and uncoated experiments.

Figure 4:
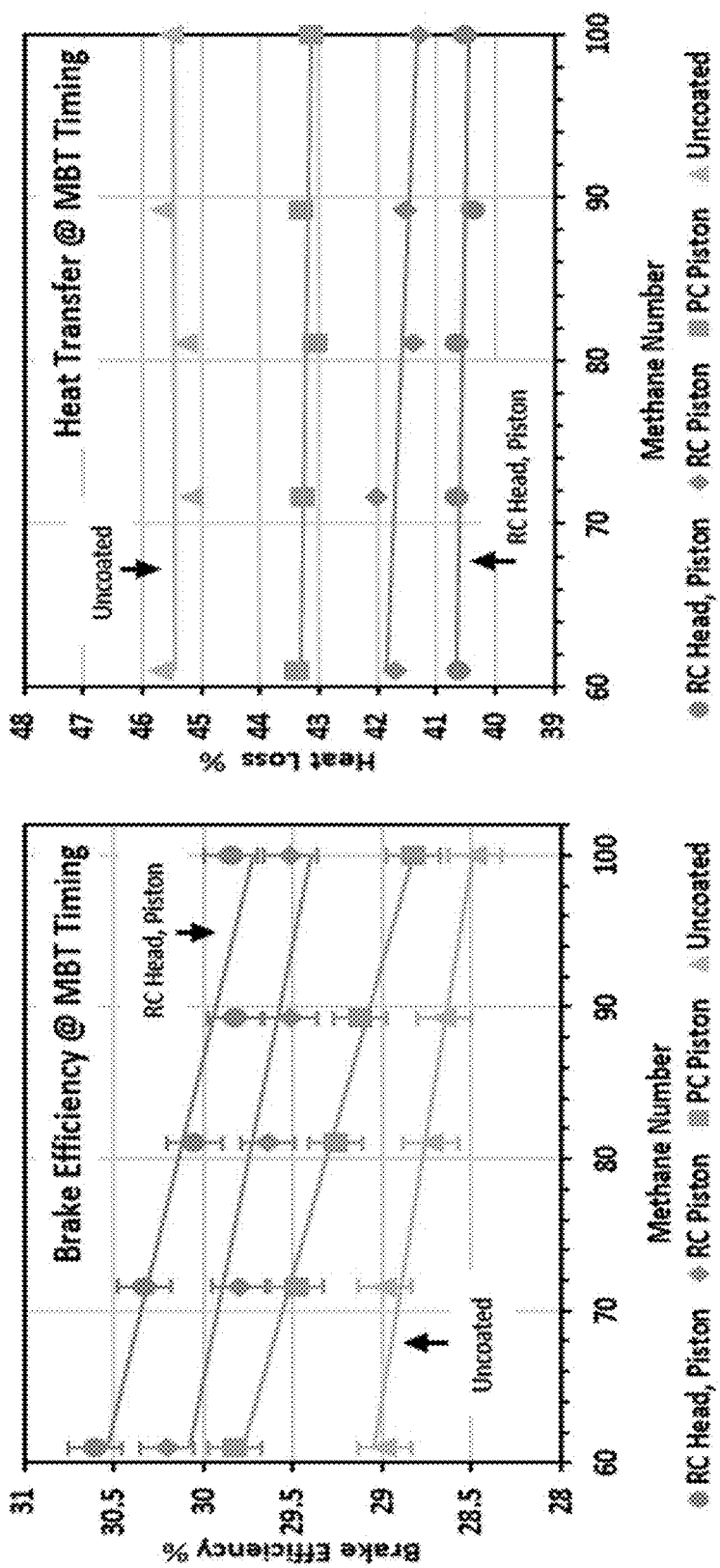
FIG. 4 shows the MBT timing brake thermal efficiency (left) and heat loss (right) for each coating of the Example across methane numbers.

Exhaust losses were calculated from the measured exhaust temperature. FIG. 4 shows the brake thermal efficiency (left) and energy balance-based heat loss (right). It can be seen that the coatings improved the overall brake thermal efficiency compared to the uncoated engine and reduced the overall heat loss. The coatings improvements in efficiency followed the predicted trend based on the coatings' material properties. Since the RC coating had a 23% lower heat capacity than the PC coating, it was expected to have improved heat retention in the cylinder. The extension of the RC coating to the head of the engine further improved brake efficiency while reducing heat losses.

Equivalent Spark Timing

Figure 5:
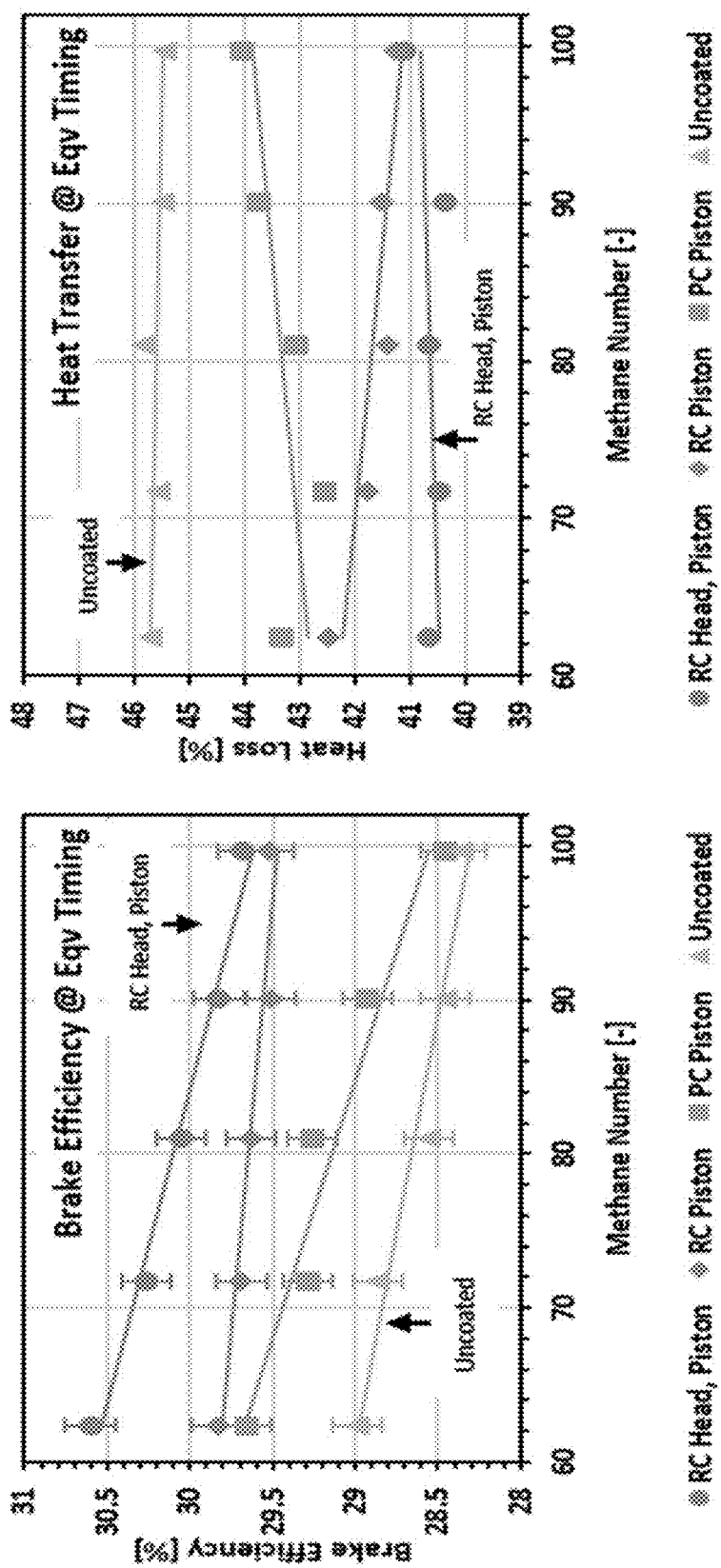
FIG. 5 depicts the (left) equivalent spark timing brake thermal efficiency and (right) heat loss for each coating of the Example across methane numbers.

Since the MBT spark timings were shown to be very close, an energy balance was calculated for the equivalent spark timings across coatings near the MBT timing. FIG. 5 shows the brake thermal efficiency and heat loss at constant spark timing. The trends observed at MBT timing were preserved in the constant spark timing experiments. That is, the coatings improved brake thermal efficiency and appeared to reduce heat loss. Again, the RC coated head and piston showed the highest improvement in brake thermal efficiency and reduction in heat loss over the coated engine.

Knock Limited Spark Advance

To find the knock limited spark advance for each coating across methane numbers, spark timing was swept in two-degree increments. As spark timing was advanced, the number of knocking cycles increased due to the higher temperatures of the end gas. When the methane number was decreased, the number of knocking cycles increased due to the higher auto-ignition properties of propane. The addition of the RC coating to the head and piston advanced the knock timing from 2 degrees up to 6 degrees. This advancement in turn allowed a methane number of 10 lower, while achieving equivalent KLSA as the uncoated engine.

Figure 6:
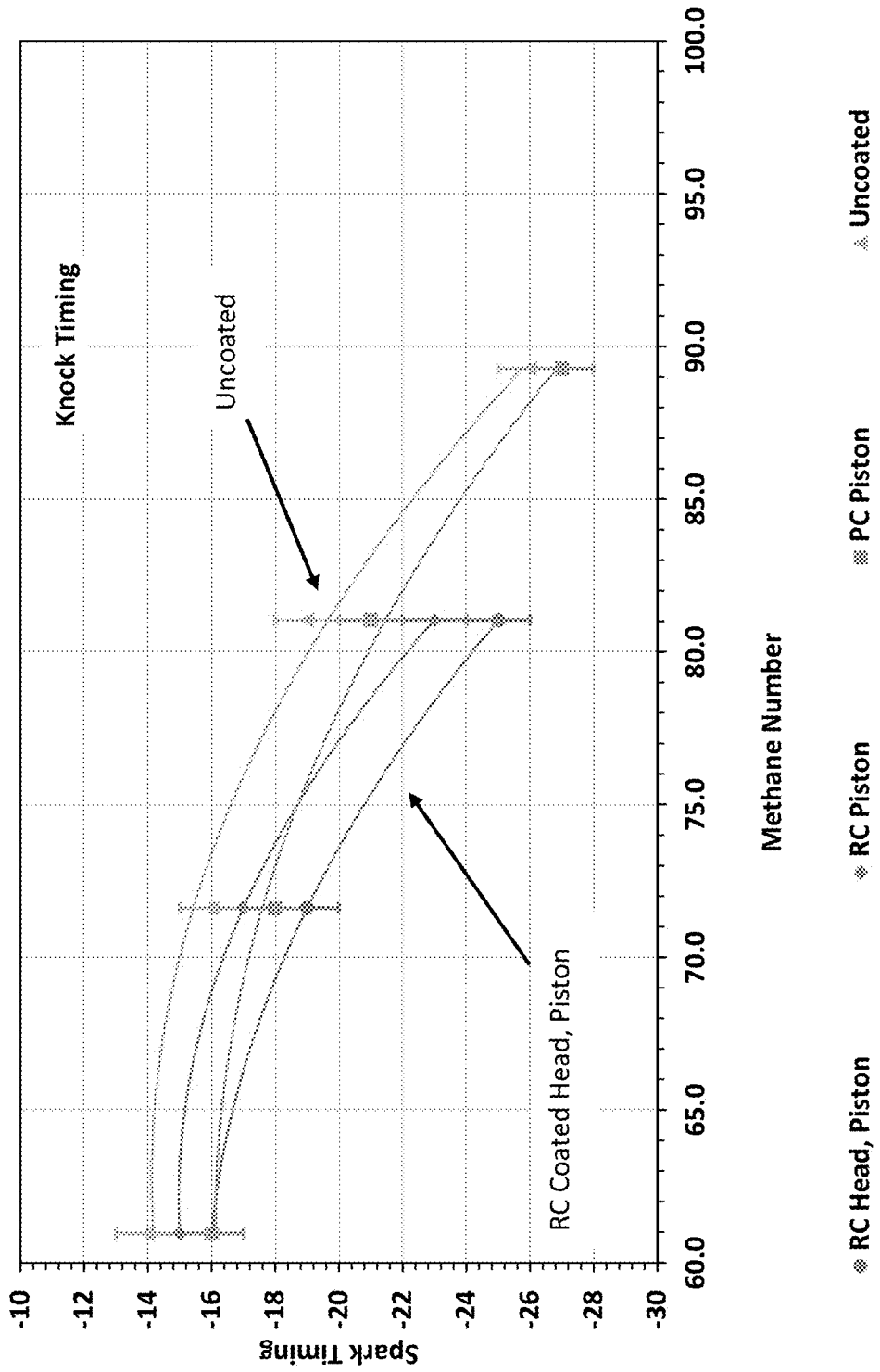
FIG. 6 depicts the knock limit spark timing for each coating in the Example across the methane numbers.

The KLSA for each of the coatings is shown in FIG. 6. Overall, the addition of the thermal barrier coatings delayed KLSA. This was most evident at higher methane numbers. At a methane number of 90, neither of the RC coatings exhibited knock compared to the uncoated and PC coated piston engines. At a methane number of 100, none of the engine configurations entered a knocking regime.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A thermal barrier coating comprising aluminosilicate microparticles dispersed in an organic polysilazane binder, wherein organic polysilazanes are the only binders present in the coating.

2. The coating of claim 1, wherein the organic polysilazanes comprise a methyl-substituted organic polysilazane.

3. The coating of claim 1 having the aluminosilicate microparticles content in the range from 10 wt. % to 60 wt. %.

4. The coating of claim 3 having a density of 0.3 gm/cm3 or lower.

5. A coated substrate comprising:
   a substrate having a surface; and
   a thermal barrier coating on at least a portion of the surface, the thermal barrier coating comprising aluminosilicate microparticles dispersed in an organic polysilazane binder, wherein organic polysilazanes are the only binders present in the coating.

6. The coated substrate of claim 5, wherein the substrate is an engine component.

* * * * *